United States Patent [19]

Kühbauch

[11] Patent Number: 5,157,314
[45] Date of Patent: Oct. 20, 1992

[54] WINDSHIELD WIPING SYSTEM FOR MOTOR VEHICLES

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 548,924

[22] PCT Filed: Oct. 4, 1989

[86] PCT No.: PCT/DE89/00630

§ 371 Date: Jul. 23, 1990

§ 102(e) Date: Jul. 23, 1990

[87] PCT Pub. No.: WO90/05654

PCT Pub. Date: May 31, 1990

[30] Foreign Application Priority Data

Nov. 22, 1988 [DE] Fed. Rep. of Germany ....... 3839382

[51] Int. Cl.$^5$ ................................. B60S 1/08
[52] U.S. Cl. ............................ 318/443; 318/DIG. 2; 15/250.270; 15/250.34
[58] Field of Search ................. 318/443, 444, DIG. 2; 15/250.12, 250.13, 250.16, 250.17, 250.23, 250.27, 250.29, 250.3, 250.31, 250.32, 250.33, 250.34

[56] References Cited

U.S. PATENT DOCUMENTS

| | | | |
|---|---|---|---|
| 2,732,523 | 1/1956 | Schnepf | 318/466 |
| 2,899,510 | 8/1959 | Merriam | 200/61.39 |
| 3,689,817 | 9/1972 | Elliott | 318/443 |
| 4,309,646 | 1/1982 | Liedtke et al. | 318/443 |
| 4,405,887 | 9/1983 | Tamura et al. | 318/443 |
| 4,599,546 | 7/1986 | Uemura | 318/443 |
| 4,705,997 | 11/1987 | Juzswik | 318/443 X |
| 4,707,641 | 11/1987 | Guerard et al. | 318/443 |
| 4,768,257 | 9/1988 | Brusasco | 15/250.3 |
| 4,866,359 | 9/1989 | Schmid et al. | 318/471 |
| 5,070,572 | 12/1991 | Kuhbauch | 15/250.13 |

Primary Examiner—Bentsu Ro
Attorney, Agent, or Firm—Michael J. Striker

[57] ABSTRACT

The wiping device for a windshield of a motor vehicle includes at least one wiper lever with an articulated wiper element which contacts the windshield and is driven in a reciprocating manner between two reversing positions by a drive unit. A particularly reliable and precise operation is obtained, when the wiper lever is provided with at least one sensor on the windshield detecting a predetermined operating position of the wiper lever. The wiping device has a control device, to which the sensor and the drive unit are in working connection so that the drive unit can operate the wiper lever according to signals from the sensor. When the wiping device for the motor vehicle has two wiper levers, one sensor is advantageously positioned on the passenger's side of the windshield at a parking position outside of the wiper field over which the wiper element of the corresponding wiper lever brushes, while another sensor is provided on the driver's side, which detects one of the reversing positions of the other wiper lever on the driver's side. When a pendulum transmission is used to connect the drive unit and the wiper lever and the pendulum transmission contains a connecting rod, the connecting rod may contain an actuating element which changes its length on receiving a signal or electrical energy from the control device in response to a signal from a sensor. Additional sensors may be provided so that there is one sensor for each reversing position of each wiper lever or two sensors adjacent a reversing position of each wiper lever, all sensors being connectable to the signal control device.

12 Claims, 4 Drawing Sheets

WINDSHIELD WIPING SYSTEM FOR MOTOR VEHICLES

BACKGROUND OF THE INVENTION

The present invention relates to a wiping system or device for a windshield of a motor vehicle.

One wiping device for the windshield includes a wiper lever with a wiper element which contacts the windshield. The wiper lever is driven in a reciprocating manner between two reversing positions by a drive unit. The drive unit comprises an electric drive motor. Such a wiping device is already known (DE-OS 29 34 874) in which the size of the wiping field to be brushed over on the windshield by the wiper blades and its position on the windshield are subject to considerable changes which have been found extremely disturbing by motor vehicle manufacturers and their customers. This is caused by the fluctuating friction conditions between the windshield and the wiper element, changing frictional speeds of the wiper element on the windshield which, in connection with the inertial forces, elasticity and play in the wiping contact, as well as tolerances in the body, prevent the achievement of an optimal wiping field or the wiping field which has been predetermined with respect to construction, although the relative spacing of all articulation points of the wiping device is unchangeable during operation. However, the wiping field should reach as close as possible to the lateral edge of the windshield, particularly on the driver's side.

SUMMARY OF THE INVENTION

It is an object of the present invention to provide a windshield wiping device which avoids the above described disadvantages.

This object and others which will be made more apparent hereinafter is attained in a wiping device for a windshield of a motor vehicle comprising a drive unit including an electric drive motor; a first and second wiper lever, each of the wiper levers having a wiper element for contacting the windshield; a first wiper shaft secured to the first wiper lever and a second wiper shaft secured to the second wiper lever, and a pendulum transmission connected to the drive unit and each of the wiper shafts so that the drive unit can impart a pendulum type motion to the first wiper lever and second wiper lever and each of the wiper levers is driven in a reciprocating manner between two reversing positions via the pendulum transmission. Each of the wiper levers is associated with a wiper field on the windshield over which the wiper element of the wiper lever brushes.

According to the invention a plurality of sensors and a control device connected to the sensors and the drive unit is provided. Each of the sensors is positioned in the motor vehicle to detect a predetermined operating position of a wiper lever. At least one sensor is located on the driver's side of the windshield and detects when the wiper lever on the driver's side reaches a reversing position located adjacent to a side edge of the windshield. Another of the sensors is located in the vicinity of another reversing position, the other reversing position being located outside the wiper field of the wiping lever associated with the other reversing position, advantageously at a parked position of the wiper lever. The control device connected with the drive unit and the sensors receives a signal generated by a sensor when one of the wiper levers reaches at least one of the predetermined operating positions and the control device controls the drive unit according to the sensors. Also an actuating element is connected to the control device and arranged in a connecting rod which is part of the pendulum transmission. The actuating element, which includes another electric motor, is structured to change an effective length of the connecting rod in a working connection with the control device.

Advantageously a sensor is arranged at each reversing position of each of the two wiper levers.

An additional sensor may be positioned spaced from one of the sensors at the reversing positions in the wiping direction toward the other reversing position.

The sensors advantageously can be arranged on the windshield but can also be located on the wiper lever.

The sensors are preferably proximity switches.

Advantageously the drive unit has a power take-off shaft and the power-take-off shaft serves as one of the wiper shafts of the wiper levers.

BRIEF DESCRIPTION OF THE DRAWING

Embodiment examples of the invention are shown in the drawing and explained in more detail in the following description.

DESCRIPTION OF THE EMBODIMENT EXAMPLES

Figure 1:
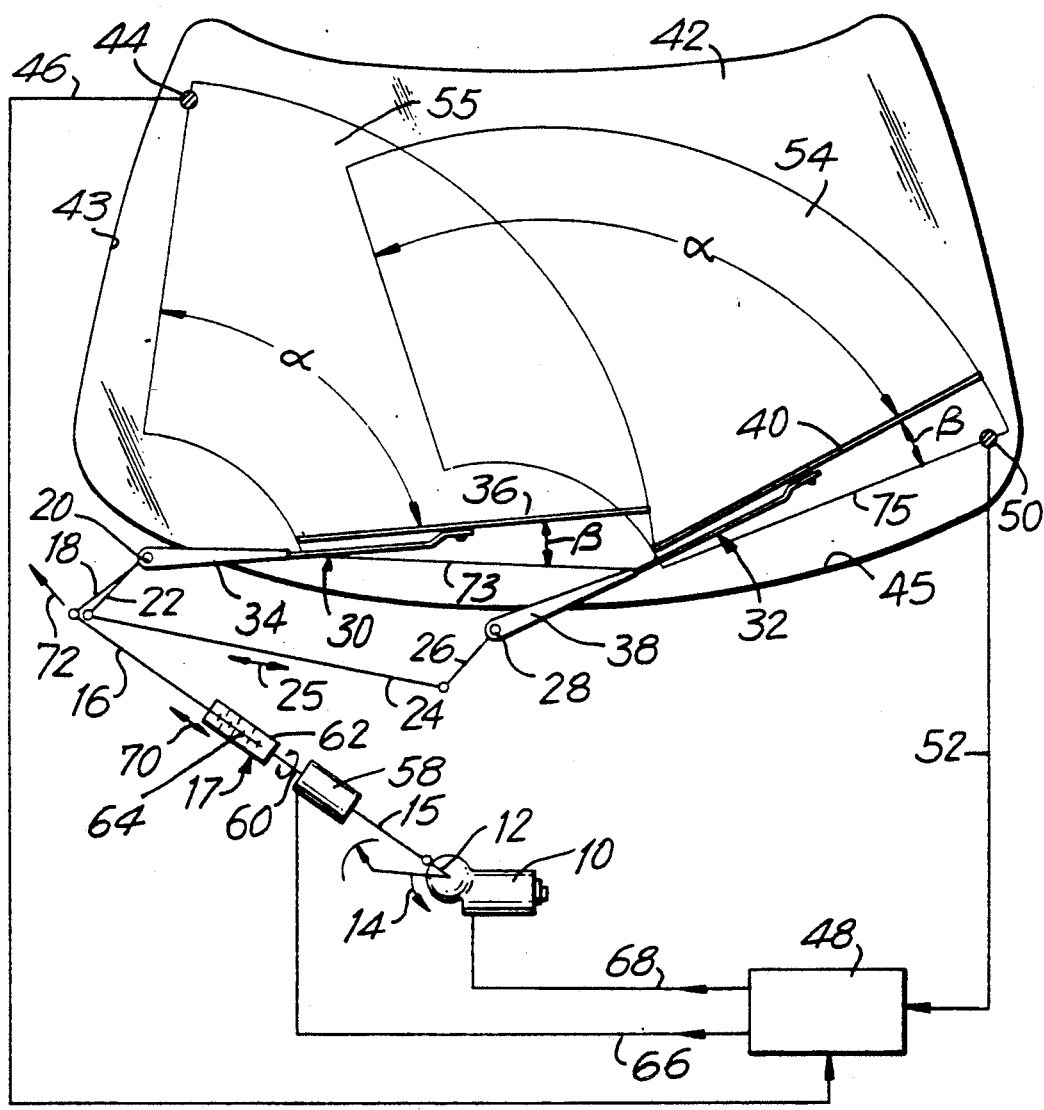
FIG. 1 is a schematic elevational view of one embodiment of a pendulum type wiping device for motor vehicle windshields comprising two wiper levers which are connected with one another via transmission rod linkage and driven via a common drive unit.

A wiping device shown in FIG. 1 comprises an electromotive drive unit 10, e.g. an electric motor, whose output rotational movement is effected at a crank 12 in the direction of the arrow 14. A connecting rod 17 comprising two parts 15 and 16 is articulated at the crank 12, the end of the connecting rod 17 remote of the drive unit 10 being connected in an articulated manner with a rocker 18 which is fastened in turn at a wiper shaft 20 which is supported in such a way that it can execute a pendulum movement. In addition, a second rocker 22 is securely connected with the wiper shaft 20, one end of a second connecting rod 24 being articulated at the free end of the rocker 22. The free end of a rocker 26 is connected in an articulated manner with the other end of the connecting rod 24, the other end of the rocker 26 being securely connected with a second wiper shaft 28. A wiper lever 30 and 32, respectively, is securely connected with each of the two wiper shafts 20, 28. The wiper lever 30 comprises a wiper arm 34, a wiper element 36 constructed as a wiper blade being arranged at the free end of the wiper arm 34 in an articulated manner. The wiper lever 32 comprises a wiper arm 38, a wiper blade 40 likewise being articulated at its free end. The two wiper levers 30 and 32, respectively, contact a pane of glass 42 of a motor vehicle, not shown in more detail, with their wiper blade 36 and 40, respectively, in each instance. This pane of glass can be the windshield or the rear window of a motor vehicle.

It is noted that the arrangement according to FIG. 1 is drawn as viewed from the interior of the motor vehicle. The wiper lever 30 is thus located on the driver's side, while the wiper lever 32 is responsible for the passenger side. A sensor 44 is arranged on the windshield 42 in the vicinity of the edge 43 of the windshield 42 on the driver's side, which sensor 44 is connected with an electronic control device 48 via a control line 46. Further, a second sensor 50, which is connected with the electronic control device 48 via a control line 52, is arranged on the passenger's side of the windshield 42 in the vicinity of its lower edge 45. The sensor 50 is located outside the area of the windshield 42 brushed over by the wiper blade 40, specifically below the wiping field 54 which is brushed over by the wiper blade 40 at a pendulum angle $\alpha$. On the driver's side, the pendulum angle of the wiper blade 36 is likewise designated by $\alpha$ during the operation of the wiping device. The second sensor 50 lies below or outside the wiping field 54 by a magnitude designated by the angle $\beta$ in FIG. 1. The wiping field of the wiper blade 36 for the driver's side has been provided with reference number 55 in FIG. 1.

It is also important that an electric drive motor 58, whose power take-off shaft 60 comprises a threaded nut 62, is fastened at the first connecting rod, specifically at part 15. The other part 16 of the connecting rod comprises a threaded spindle 64 cooperating with the threaded nut 62. The electric drive motor 58 is connected with the electronic control device 48 via a control line 66. Another control line 68 leads from the control device 48 to the drive unit 10.

During the operation of the wiping device, the crank 12 of the drive unit 10 rotates in the direction of the arrow 14, so that the connecting rod 17 carries out a substantially reciprocating movement (double arrow 70). In so doing, the rockers 18 and 22 oscillate around the pendulum axis of the wiper shaft 20, so that the connecting rod 24 also carries out a reciprocating movement designated by means of a double arrow 25. The rocker 26 oscillates around the pendulum axis of the wiper shaft 28. At the same time, however, the two wiper levers 30 and 32 also oscillate at the pendulum angle designated by $\alpha$, which is given by the two wiping fields 54 and 55 on the windshield. The magnitude of the pendulum angle $\alpha$ is determined by the design of the pendulum transmission 12, 17, 18, 22, 24, 26. But the position of the two wiping fields 54 and 55 is determined solely by the sensor 44 which signals the electronic control device 48 when the wiper blade 36 has reached the sensor 44. If this is not achieved due to the aforementioned circumstances, another control pulse of the electronic control device 48 is sent to the drive motor 58 which drives the threaded nut 62 in the direction such that the effective length of the connecting rod 17 is shortened, so that the wiping fields 55, 54 are shifted in such a way that the wiper blade 36 is detected by the sensor 44. Thus, the drive motor 58, together with the transmission nut 62 and the threaded spindle 64, forms an actuating element for adjusting the effective length of the connecting rod 17. In this way, it is ensured that the position of the wiping field 55 which is important for the driver of the motor vehicle is constantly maintained. A slight shifting of the wiping fields 54, 55 on the windshield 42 is unimportant. But it is important for the driver that the prescribed wiper lever-reversing position located in the area of the sensor 44 is constantly maintained.

However, if the wiper system is to be stopped, the drive unit 10 is switched off by the electronic control device 48 when the wiper levers 30 and 32 are located in the positions shown in FIG. 1. But the drive motor 58 then simultaneously receives a corresponding command from the electronic control device 48, so that it lengthens the effective length of the connecting rod 15, 16 until the rockers 18, 22 and 26 are swiveled in the direction of the arrow 72 around an angle $\beta$, so that the two wiper levers 30, 32 and their wiper blades 36, 40 are moved into a so-called parked position 73, 75 in which the position of the wiper blade 40 is determined by the second sensor 50 and is reported via the control line 52 of the electronic control device 48. The drive motor 58 is then also switched off.

When the wiping device is switched on again, the drive motor 58 shortens the effective length of the connecting rod 17 in such a way that the two wiping fields 54 and 55 again occupy the position shown in FIG. 1.

Figure 2:
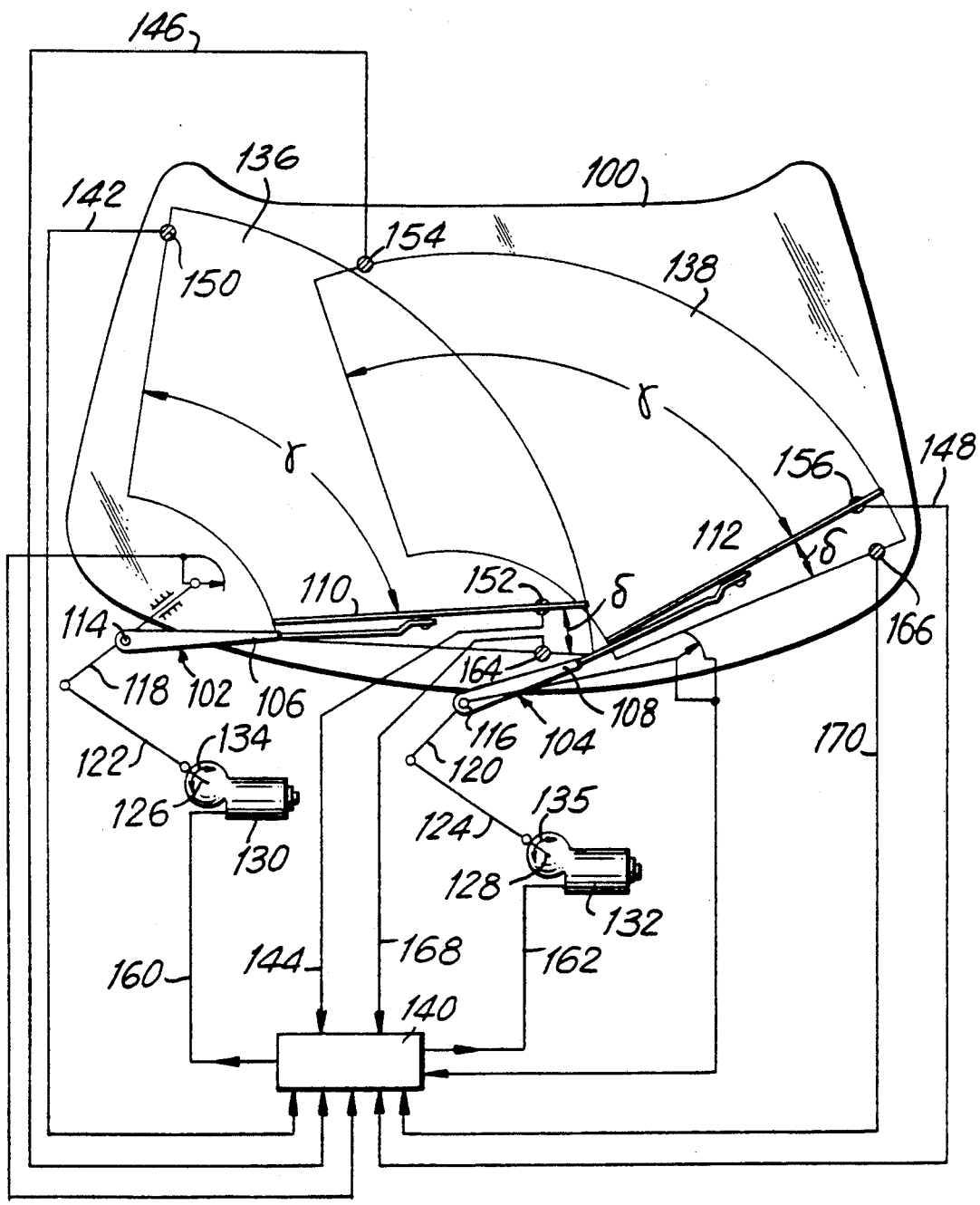
FIG. 2 is a schematic elevational view of another embodiment of a pendulum type wiping device comprising two wiper levers which are driven independently of one another and each have their own drive unit, the drive units operating synchronously.

In the embodiment form according to FIG. 2, two wiper levers 102 and 104 are likewise assigned to the windshield 100. In this case, also, every wiper lever comprises a wiper arm 106 and 108, respectively, as well as a wiper blade 110 and 112, respectively, which is articulated at the latter. Every wiper lever is supported so as to oscillate via a wiper shaft 114 and 116, respectively, in the body of a motor vehicle, not shown in more detail. Further, a rocker 118 and 120, respectively, is securely connected with each wiper shaft. A connecting rod 122 and 124, respectively, is articulated in each instance at the free ends of the two rockers 118 and 120, respectively, which ends are remote of the wiper shaft 114 and 116, respectively, the other end of the connecting rod 122 and 124 being connected in an articulated manner with the free end of a driven crank 126 and 128, respectively. The drive of the crank 126 and 128, respectively, is effected via an electromotive drive unit 130 and 132, respectively. The electromotive drive units 130 and 132 may be electric motors.

The drive units 130 and 132 impart an output movement to the cranks 126 and 128, respectively, depending on the rotating direction, which is indicated by means of the two double arrows 134 and 135. This drive movement is transmitted to the respective wiper lever 102 and 104 via the transmission rod linkage 122, 128 and 124, 120, respectively. Every wiper lever contacts the windshield 100 with its wiper blade 110 and 112, respectively. During the operation of the wiping device, the wiper blades 110 and 112 brush over a wiping field 136 and 138, in that they oscillate on the windshield at an angle $\gamma$. The control of the drive units 130 and 132 is effected by means of an electronic control device 140 which is connected via control lines 142, 144 and 146, 148, respectively, with sensors 150, 152 and 154, 156, respectively, arranged at the windshield 100. In addition, the drive units 130 and 132 are connected with the electronic control device 140 by means of control lines 160, 162. The sensors 150 and 152 assigned to the wiper blade 110 for the wiping field 136 are arranged at the windshield in such a way that the pendulum angle $\gamma$ corresponds to the requirements. This is also true for the sensors 154 and 156, respectively, which are assigned to the wiper blade 112 responsible for the wiping field 138. However, it must be noted that the sensor 154 in the position shown in FIG. 2 does not signal the electronic control device 140 that the pendulum reversing position has been reached, rather it only signals that a determined wiper blade position has been reached. This is because the sensor 154 must lie outside the wiping field 136 of the wiper blade 110 so that it can not be influenced by the wiper blade 110. The electronic control device 140 must thus take into account that the wiper lever 104 must cover a determined distance in order to reach the prescribed wiping field or the required overlapping of the two wiping fields 136, 138, so that the required pendulum angle $\gamma$ results. On the other hand, the sensor 156 can be arranged directly in the pendulum reversing position, as shown by the embodiment example. This is also true for the sensor 152 for the wiper blade 110 which is responsible for the other pendulum reversing position of the wiper blade 110. Another sensor 164 and 166, respectively is arranged outside the two wiping fields 136 and 138, respectively, below the respective wiping fields, which sensors 164 and 166 are connected with the electronic control device 140 via control lines 168 and 170, respectively. During the operation of the wiping device, the two wiper levers 102, 104 oscillate with their wiper blades 110 and 112, respectively, over the windshield 100. The sensors 150 and 152, 154, 156 ensure that the two drive units 130 and 132, respectively, reverse their drive direction when the wiper blades 110 and 112, respectively, have reached their prescribed reversing positions which lie apart in FIG. 2 by the two pendulum angles $\gamma$. After the wiping device is switched off, the two wiper levers run further down beyond their positions in the drawing until the wiper blades 110 and 112, respectively, are detected by the two sensors 164 and 166, respectively. The electronic control device 140 then switches off the drive units 130 and 132, so that the two wiper levers 102 and 104 are stopped in a so-called parked position which lies outside the two wiping fields 136 and 138, respectively, by the angle $\delta$.

However, the sensor 154 can also be encoded in such a way that it only responds to the wiper blade 112. In such a case, the sensor 154 can likewise be arranged directly in the reversing position of the wiper blade 112, since the wiper blade 110 can then not produce any reaction in the sensor 154.

Figure 3:
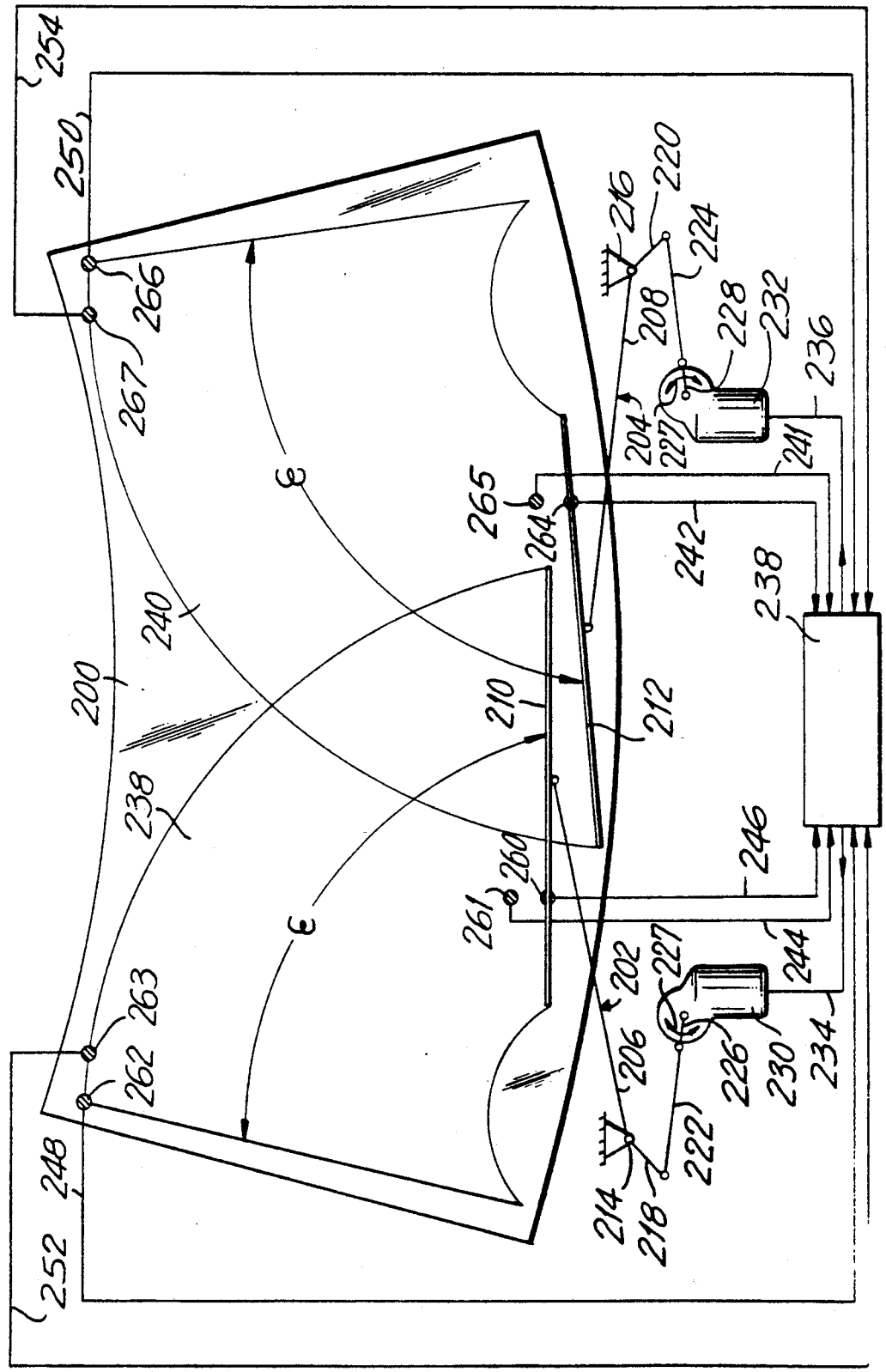
FIG. 3 is a schematic elevational view of an additional embodiment of a pendulum type wiping device, according to my invention in which the two wiper levers work in opposite directions.

In the embodiment according to FIG. 3, there is likewise a windshield 200, to which a wiping device is assigned which comprises two wiper levers 202, 204. A wiper arm 206 and 208, respectively, which is driven so as to oscillate, is assigned to each wiper lever 202, 204, respectively. Each wiper arm carries a wiper blade 210 and 212, respectively, at one end, which wiper blade 210, 212 contacts the windshield 200. Each wiper lever 202 and 204, respectively, is supported in a fixed bearing 214 and 216, respectively, in such a way that it can execute a pendulum type movement. A wiper shaft is supported in each of the two so-called wiper bearings 214 and 216, respectively, a rocker 218 and 220, respectively, being fastened to the wiper shaft. One end of a connecting rod 222 and 224, respectively, is articulated at each of the free ends of the rockers 218 and 220, respectively, the other end being connected in an articulated manner with a crank 226 and 228, respectively, which is driven so as to oscillate in a reciprocating manner. The cranks 226, 228 belong in each instance to a drive unit 230 and 232, respectively, which ensures a pendulum movement of the wiper levers 202 and 204. The wiper blades 210 and 212, respectively, contacting the windshield oscillate at an angle $\epsilon$ over the windshield 200 and, in so doing, process a wiping field 238 and 240, respectively. The two drive units 230 and 232, respectively, are connected with an electronic control device 238 via control lines 234 and 236, respectively, other control lines 241, 242, 244, 246, 248, 250, 252, 254 leading from the latter to sensors arranged on the windshield 200, whose positions are indicated in the following: As shown in FIG. 3, one sensor 260 and 262 is located in the reversing positions for the wiper lever 202 in each instance. A sensor 264 and 266, respectively, is likewise arranged in the reversing positions of the wiper blade 212 for the wiper lever 204. Another sensor which is located inside the pendulum angle $\epsilon$, respectively, and at least partially within the wiping fields 238 and 240, respectively, is assigned to each of these four sensors 260, 262, 264, 266. Thus, two sensors 261 and 263, which are connected with the electronic control device 238 via the control lines 252 and 244, are assigned to the two sensors 260, 262. Another sensor 265 is assigned to the sensor 264, and another sensor 267 is assigned to the sensor 266. The two additional sensors 265 and 267 are connected with the electronic control device 238 via the control lines 240 and 254.

During operation, the sensors 260 and 262, 264 and 266, respectively, ensure the switching of the drive units 230, 232, so that the wiper levers 202 and 204, respectively, carry out the required pendulum movement (double arrows 227). The other sensors 263, 267, 261 and 265 can serve to send a preliminary signal to the electronic control device 238, which preliminary signal e.g. reduces the work speed of the drive units 230, 232, so that the switching of the drive units can be effected without difficulty when the main signals follow from the sensors 262, 260, 264, 266. Naturally, this is also true in an analogous manner for the other reversing positions for which the sensors 260, 261 and 264, 265, respectively, are responsible. Naturally, it is also conceivable to arrange another sensor for every wiper lever which ensures that the wiper levers arrive in a so-called extended parked position in which the wiper blade is located outside the wiping field brushed over during operation.

Further, it is also conceivable to construct the power take-off shaft of the drive unit directly as a wiper shaft, so that the rod linkage transmissions 218, 220, 222, 224, 226, 228 can be dispensed with. It is possible to arrange the sensors in front of, in or behind the windshield in all of the constructions. Further, it is conceivable to construct the sensors as so-called proximity switches which are arranged in the windshield border or edge, at or in the body of the vehicle. Finally, it is also conceivable to arrange additional sensors which stop the wiping device in a so-called assembly position in which e.g. work can be carried out on the wiper lever.

In order to determine the angular speed it is particularly advisable to read off this at the wiper shafts 20, 28 and 114, 116 and 214, 216, respectively, via sensors.

Of course, the use of the inventive idea is not limited to pendulum type wiper systems, rather it is certainly also conceivable in so-called "parallel wiper systems" which are known e.g. from DE-OS 21 52 978.

Figure 4:
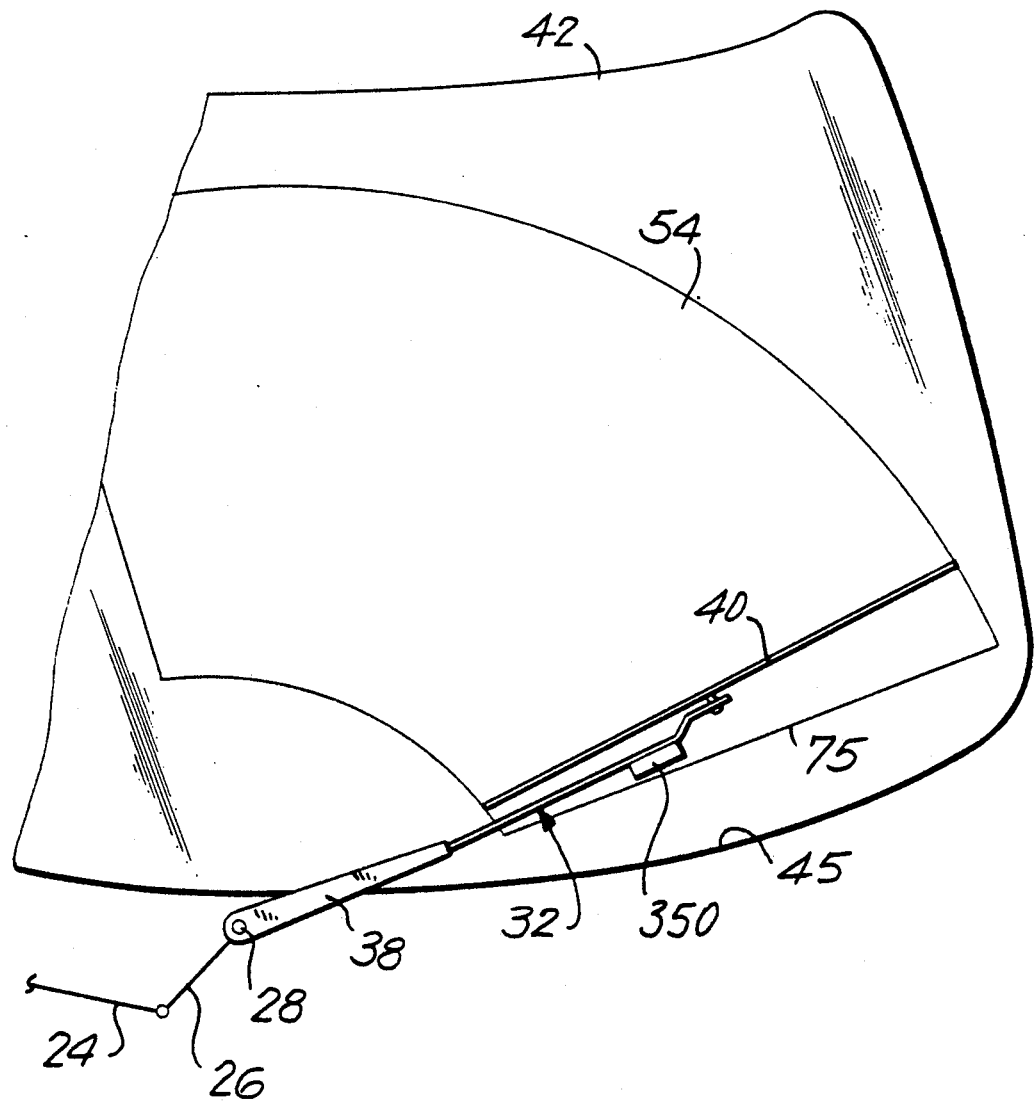
FIG. 4 is a plan view of another embodiment of the wiping device for motor vehicle windshields in which the sensor is located on the wiper lever.

Another embodiment of the wiping device is shown in FIG. 4. The sensor 350 in this case is located on the wiper lever 32. Other parts of this embodiment which have the same reference number as parts in the embodiment of FIG. 1 are the same as the part with the same reference number in the embodiment of FIG. 1. Otherwise this embodiment operates in a manner which is similar to the previous embodiments.

It will be understood that each of the elements described above, or two or more together, may also fine a useful application in other types of structures differing from the types described above.

While the invention has been illustrated and described as a windshield wiping system or device for a motor vehicle, it is not intended to be limited to the details shown, since various modifications and structural changes may be made without departing in any way from the spirit of the present invention.

Without further analysis, the foregoing will so fully reveal the fist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a wiping device for a windshield of a motor vehicle, comprising a drive unit including an electric drive motor; a first and second wiper lever, each of the wiper levers having a wiper element for contacting the windshield; a first wiper shaft secured to the first wiper lever and a second wiper shaft secured to the second wiper lever, and a pendulum transmission connected to the drive unit and each of the wiper shafts so that the drive unit can impart a pendulum type motion to the first wiper lever and second wiper lever and each of the wiper levers is driven in a reciprocating manner between two reversing positions via the pendulum transmission, each of the wiper levers being associated with a wiper field on the windshield over which the wiper element of the wiper lever rushes, the improvement comprising a plurality of sensors, each of said sensors being positioned in the motor vehicle to detect a predetermined operating position of one of the wiper levers, at least one of the sensors being located on the driver's side of the windshield and detecting when the wiper lever on the driver's side reaches one of the reversing positions of the wiper lever on the driver's side, said reversing position of the wiper lever on the driver's side so detected being located adjacent to a side edge of the windshield, another of the sensors being located in the vicinity of another reversing position of the wiper levers, said other reversing position being located outside the wiper field of the wiping lever associated with the other reversing position; and a control device connected with the drive unit and the sensors to receive a signal generated by the sensors when the wiper lever reaches at least one of the predetermined operating positions and to control said drive unit according to the sensor on the driver's side; and an actuating element connected to the control device and arranged in a connecting rod belonging to the pendulum transmission, said actuating element being structured to change an effective length of the connecting rod and said actuating element comprising another electric drive motor in a working connection with the control device.

2. The improvement as defined in claim 1, one of said sensors is arranged at each reversing position of the wiper levers.

3. The improvement as defined in claim 1, wherein an additional sensor is arranged in a wiping direction from one of the two reversing positions of one of the wiper levers and spaced from another of said sensors located at another of the two reversing positions, said additional sensor being correlated with said other sensor located at the other of the two reversing positions.

4. The improvement as defined in claim 1, wherein the other sensor is arranged at a parked position outside of said wiper field in the vicinity of a lower edge of the windshield.

5. The improvement as defined in claim 1, wherein said rive unit has a power take-off shaft and the pendulum transmission connects the power take-off shaft of the drive unit and the wiper levers.

6. The improvement as defined in claim 1, wherein said drive unit has a power take-off shaft and the power take-off shaft of the drive unit forms one of the wiper shafts.

7. The improvement as defined in claim 1, wherein the sensors are arranged at the windshield.

8. The improvement as defined in claim 1, wherein each of the sensors is arranged in the vicinity of the side edge of the windshield and is constructed as a proximity switch.

9. The improvement as defined in claim 1, wherein the sensor is arranged on the wiper lever.

10. In a wiping device for a windshield of a motor vehicle, comprising a first and second wiper lever, each of said wiper levers having an articulated wiper element contacting said windshield, a first wiper shaft secured to the first wiper lever and a second wiper shaft secured to the second wiper lever, a drive unit connected to the wiper levers to drive the wiper levers connected thereto, each of said wiper levers being driven in a reciprocating manner between two reversing positions, said drive unit comprising an electric motor; and a pendulum transmission having a connecting rod, said pendulum transmission connecting said drive unit and said wiper shafts so that the drive unit imparts a pendulum type motion to the first wiper shaft and the first wiper lever via the pendulum transmision, said pendulum type motion also being transmitted by the pendulum transmission to the second wiper shaft and the second wiper lever, and each of said wiper levers being associated with a wiper field on said windshield over which said wiper element brushes, the improvement comprising a control device connected to the drive unit, and at least one sensor positioned in the motor vehicle to detect when one of the wiper levers reaches one of the reversing positions, said reversing position of the one wiper lever detected by said at least one sensor being located adjacent a side edge of said windshield, said at least one sensor being in working connection with the control device so as to signal the control device when the at least one sensor detects that the wiper lever reaches the reversing position, said control device being connected with the drive unit to control said drive unit according to the at least one sensor; at least one other sensor located in the vicinity of another of the reversing positions of the wiper levers outside the wiper field of the wiper lever associated with the other reversing position, said at least one other sensor being located at a parked position of the wiper lever associated with the other reversing position; and an actuating element arranged in the connecting rod of the pendulum transmission, said actuating element comprising another electric motor, said actuating element being in working connection with the control device and said actuating element also being structured to change an effective length of the connecting rod.

11. The improvement as defined in claim 10, wherein one of said sensors is located in the vicinity of each of the reversing positions of the wiper levers on the windshield.

12. The improvement as defined in claim 10, wherein each of said sensors comprises a proximity switch.

* * * * *